Patented Jan. 27, 1931

1,790,418

UNITED STATES PATENT OFFICE

CHRISTIAN W. HALL, OF SALT LAKE CITY, UTAH

FIREPROOF TILE

No Drawing.    Application filed February 14, 1929.    Serial No. 339,903.

This invention relates to the class of construction materials and pertains particularly to improvements in fire-proof tiles.

The primary object of the present invention is to provide, in a manner as hereinafter set forth, an improved tile of a composition designed particularly for use in fire-proof walls and floor structures, particularly for vaults or safes, baking ovens or the like.

The improved tile embodying the present invention is, as previously stated, designed primarily for use in the building of structures which are to be subjected to heat or in the building of walls which must be of a fire resisting nature such for example as the usual fire wall constructed between abutting buildings.

The principal ingredients of this tile are silica and carbonaceous matter such for example as cinders or a similar substance, the other ingredients being in smaller proportions and serving to bond the ingredients employed into a hard product, the formation of the tile being accomplished through the subjection of the mixed ingredients to pressure in a suitable mold.

The proportions of the ingredients of the tile embodying the present invention was definitely determined through experimentation and an analysis made of a tile having the qualities desired showed the ingredients to be in the following approximate proportions which proportions are followed in the commercial production of the tile. The determination of the percentages of the ingredients was carried to two decimal places, the remaining slight amounts of each being indicated by the sign plus. The analysis is of the moisture free product, the quantity of moisture removed before the dry analysis was made approximating 14%. The dry analysis is as follows:

|  | Per cent + |
|---|---|
| Silica | 24.40 |
| Iron oxide | 1.40 |
| Lime | 16.40 |
| Aluminum oxide | 10.60 |
| Magnesium oxide | 2.30 |
| Sodium carbonate | 3.30 |
| Sulphur | 5.00 |
| Carbonaceous matter | 33.60 |
| Total | 97.00 |

Moisture 14.00%.

After combining the dry ingredients in the proportions given the mixture then has added thereto a quantity of water equaling approximately 14% of the total dry solids and after thoroughly mixing, the same is introduced into suitable molds in which blocks of a suitable form may be formed under pressure.

Having described my invention, what I claim is:—

A fire-proof tile of the character described consisting of the following ingredients combined in the following approximate proportions:

|  | Per cent + |
|---|---|
| Silica | 24.40 |
| Iron oxide | 1.40 |
| Lime | 16.40 |
| Aluminum oxide | 10.60 |
| Magnesium oxide | 2.30 |
| Sodium carbonate | 3.30 |
| Sulphur | 5.00 |
| Carbonaceous matter | 33.60 |
| Total | 97.00 | the foregoing quantities having added thereto moisture totaling approximately 14% of the whole.

In testimony whereof I hereunto affix my signature.

CHRISTIAN W. HALL.